July 14, 1931.  F. EISENLOHR ET AL  1,814,743
SPINNING SPINDLE
Original Filed March 22, 1924
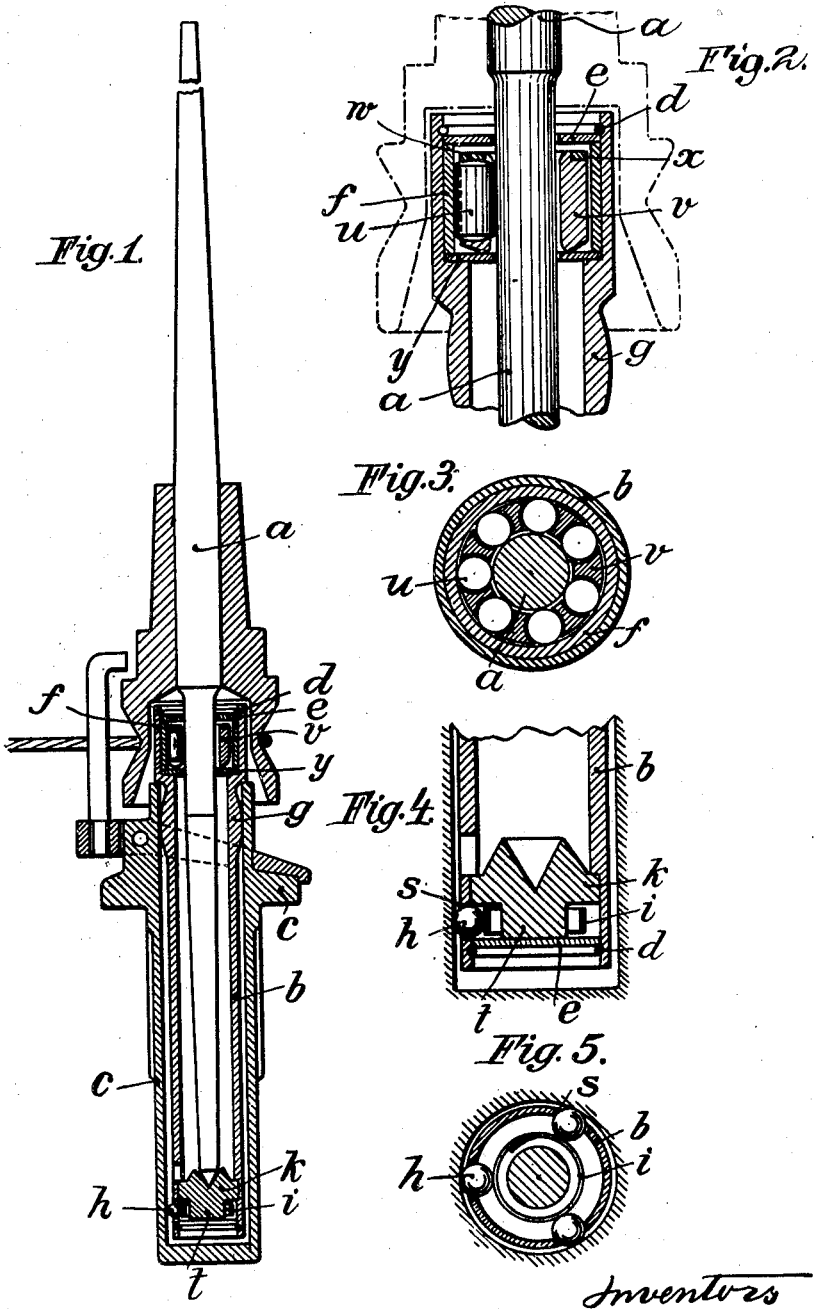

Patented July 14, 1931

1,814,743

UNITED STATES PATENT OFFICE

FRIEDRICH EISENLOHR AND CARL UEBELEN, OF STUTTGART, GERMANY; GERICHTS-NOTAR STELLRECHT, ADMINISTRATOR OF SAID CARL UEBELEN, DECEASED, ASSIGNORS, BY MESNE ASSIGNMENTS, TO NORMA-HOFFMANN BEARINGS CORPORATION, A CORPORATION OF NEW YORK

SPINNING SPINDLE

Application filed March 22, 1924, Serial No. 701,032, and in Germany March 24, 1923. Renewed May 27, 1930.

This invention has for the object to provide an improved spinning spindle of the type wherein the upper bearing and the footstep bearing are built rigidly in an inner spindle sleeve which is capable of oscillating and which is resiliently supported in a bolster tube. One object of this invention is to provide a bearing for a spinning spindle of relatively simple and durable construction, which can be easily and readily assembled and will be dust and oil tight.

A further object is to so construct the bearing as to reduce friction between the moving parts to a minimum.

With these and other objects in view, our invention consists in the construction, arrangement and combination of parts as will be hereinafter fully described and defined in the appended claims.

A practical constructional form of an improved spindle according to this invention is illustrated by way of example in the accompanying drawings in which:—

Figure 1 is a longitudinal section of the improved spindle comprising the improved upper bearing of the roller type.

Figure 2 is a longitudinal section of the improved upper bearing of the roller type, drawn to a larger scale.

Figure 3 is a cross section to Figure 2, likewise drawn to a larger scale.

Figure 4 is a longitudinal section of a ball spring-mounting for the bearing balls comprising a circularly bent leaf spring as shown in Figure 1, likewise drawn to a larger scale, and Figure 5 is a cross section to Figure 4, likewise drawn to a larger scale.

Referring to Figure 1: $a$ is a spindle mounted in an inner bolster sleeve $b$ by means of an upper bearing of the roller type. The glass-hard foot of the spindle $a$ rests in a likewise glass hard footstep bearing $k$. The entire bearing is rigidly mounted in the spindle sleeve $b$ and is closed up by a dust-tight and oil-tight cover $e$ which is held in place by a split spring ring $d$.

The spindle sleeve $b$ is mounted so as to fit with a circumferentially projecting convex surface $g$ in the bolster tube $c$. Three or four balls $h$ (Figs. 4 and 5) are pressed by a circularly bent leaf spring or a spring ring $i$ against the walls of the bolster tube $c$. $s$ are notches engaging the balls so that the latter will be prevented from falling out when the spindle sleeve $b$ is drawn out of the bolster tube $c$. $t$ is a shoulder on the footstep bearing $k$ (Figs. 3 and 4) which will prevent the balls from falling into the bolster tube $c$ when the spring $i$ is taken out.

In the improved bearing illustrated in Figures 2 and 3 the rollers $u$ are mounted in an annular cage $v$; these rollers are mounted in a plurality of cylindrical holes spaced uniformly apart. A cover $w$ closes the cage $v$ and is held in place by nibs $x$ which for this purpose are bent over so as to engage in a recess in the cover.

The rollers $u$ are convex at their ends, to bear between said cover $w$ and the bottom of said cage $v$. The latter is formed with a spherical outwardly bulging or convex end surface upon a hard ground footstep plate $y$ which is fixed, together with the outer annular race $f$, in the spindle sleeve $b$.

The rollers $u$ work between the annular race $f$ and the spindle $a$.

Having now particularly described and ascertained the nature of our said invention and in what manner the same is to be performed, we declare that what we claim is:—

1. A spinning spindle, a bolster tube, a bolster sleeve resiliently supported within the bolster tube, and having an exterior spherically shaped enlargement acting upon the inner wall of the bolster tube for permitting the oscillation of the bolster sleeve in respect to the bolster tube, a footstep bearing rigidly built into the lowermost end of the bolster sleeve and having resiliently held ball bearings interposed between the footstep bearing and the inner wall of the bolster tube, permitting said oscillation of the bolster sleeve, dust and oil proof closing means for said footstep bearing, a roller bearing rigidly built into the upper end of the bolster sleeve comprising a hard ground plate supported by said bolster sleeve, a plurality of rollers, a cage for said rollers having its lowermost portion bevelled and resting upon said plate, and an enclosing top member for said rollers and cage secured to said bolster sleeve, and a spindle proper having a whirl and bearing upon said roller bearings and footstep bearing.

2. In a spinning spindle of the character described, a spindle proper, a bolster tube, a bolster sleeve in said tube having an external enlargement near its upper end bearing upon the wall of said tube and constituting a fulcrum for the bolster sleeve, a roller bearing mounted in the upper end of the bolster sleeve above said enlargement and engaging the spindle proper, an additional bearing in the lower end of said bolster sleeve receiving the lower end of the spindle proper, and a plurality of bearing members resiliently mounted in the wall of the bolster sleeve at its lower end and engaging the wall of the bolster tube to yieldingly center said sleeve therein.

3. In a spinning spindle of the character described, a spindle proper, a bolster tube, a bolster sleeve in said tube having an enlarged cylindrical upper end positioned above the bolster tube and provided below said upper end with an externally convex portion having rocking engagement with the inner surface of the bolster tube, a roller bearing mounted in said cylindrical upper end of the bolster sleeve and engaging the spindle proper, the lower end of said sleeve being provided with spaced openings in its wall, anti-friction members movable through said openings, means within the bolster sleeve yieldingly coacting with said members to hold the same in rolling contact with the wall of the bolster tube, and a fixed bearing within said bolster sleeve for the lower end of the spindle.

In testimony whereof we affix our signatures.

FRIEDRICH EISENLOHR.
CARL UEBELEN.